(12) United States Patent
Iverson et al.

(10) Patent No.: US 6,735,819 B2
(45) Date of Patent: May 18, 2004

(54) HAND MOUNTABLE VEHICLE CARPET AFFIXATION DEVICE (75) Inventors: David S. Iverson, Chicago, IL (US); David F. MacNeil, 205 E. Sixth St., Hinsdale, IL (US) 60521

(73) Assignee: David F. MacNeil, Hinsdale, IL (US)

( * ) Notice: Subject to any disclaimer, the term of this patent is extended or adjusted under 35 U.S.C. 154(b) by 0 days.

(21) Appl. No.: 10/112,811

(22) Filed: Mar. 29, 2002

(65) Prior Publication Data

US 2002/0112324 A1 Aug. 22, 2002

Related U.S. Application Data (63) Continuation-in-part of application No. 09/738,748, filed on Dec. 15, 2000, now Pat. No. 6,385,812, and a continuation-in-part of application No. 09/750,807, filed on Dec. 28, 2000, now Pat. No. 6,412,142.

(30) Foreign Application Priority Data

Dec. 14, 2001 (DE) .......................... 101 61 525

(51) Int. Cl.⁷ ............................................... A47G 27/04
(52) U.S. Cl. .................... 16/4; 16/6; 24/546; 24/590.1; 411/553
(58) Field of Search .............................. 16/4, 6, 8, 17.1; 248/217.2; 411/450, 457–460, 549, 551, 552, 553; 24/350, 354, 380, 357, 709, 295, 296, 546, 590.1

(56) References Cited

U.S. PATENT DOCUMENTS

| 931,023 | A | 8/1909 | Albertoni et al. |
| 2,033,039 | A | 3/1936 | Limpert |
| 3,981,050 | A | 9/1976 | Dauphinais |
| 3,986,780 | A | * 10/1976 | Nivet .......................... 403/353 |
| 4,271,641 | A | 6/1981 | Kawaguchi |

(List continued on next page.)

FOREIGN PATENT DOCUMENTS

| DE | 3238121 A1 | * | 4/1984 |
| DE | 3632618 A1 | * | 4/1988 |
| DE | 4218213 C1 | * | 2/1994 |
| DE | 29611827 U1 | | 12/1996 |
| EP | 0188639 A1 | * | 7/1986 |
| EP | 0211966 A1 | | 3/1987 |
| EP | 0536923 A1 | * | 4/1993 |
| EP | 0559352 A1 | * | 9/1993 |
| GB | 269278 | | 4/1927 |
| WO | WO 97/45291 | | 12/1997 |

Primary Examiner—Chuck Y. Mah
(74) Attorney, Agent, or Firm—Piper Rudnick LLP; Jefferson Perkins (57) ABSTRACT A vehicle floor mat affixation device includes a noncircular shaped body with an axial extending connector. The connector secures the affixation device to the vehicle floor. A reverse face of the affixation device includes a panel of releasable fastening material that is designed to mate with a similar panel of releasable fastening material in the vehicle floor mat. The present invention resists affixation device pull-out as well as shear forces applied to the mat with respect to the carpeting on which the mat is placed, but nonetheless permits easy removal and replacement of the vehicle floor mat and of the affixation devices without tools.

17 Claims, 6 Drawing Sheets

U.S. PATENT DOCUMENTS

| | | |
|---|---|---|
| 4,403,895 A | 9/1983 | Caldwell et al. |
| 4,561,146 A * | 12/1985 | Schaty .............................. 16/7 |
| 4,564,546 A | 1/1986 | Jones |
| 4,860,402 A | 8/1989 | Dichtel |
| 4,878,792 A | 11/1989 | Frano |
| 4,893,978 A * | 1/1990 | Frano ......................... 411/553 |
| 4,901,961 A | 2/1990 | Gish |
| 4,981,405 A * | 1/1991 | Kato ........................... 411/349 |
| 4,998,319 A | 3/1991 | Ford |
| 5,003,664 A | 4/1991 | Wong |
| 5,011,356 A * | 4/1991 | Fernandez ................ 411/553 |
| 5,014,390 A | 5/1991 | De Gastines |
| 5,018,235 A | 5/1991 | Stamatiou et al. |
| 5,142,834 A * | 9/1992 | Laclave et al. ............... 52/208 |
| 5,195,857 A | 3/1993 | Hiramoto |
| 5,364,150 A * | 11/1994 | Cochran et al. ........... 296/39.2 |
| 5,368,427 A * | 11/1994 | Pfaffinger .................. 411/553 |
| 5,384,939 A | 1/1995 | Weber |
| 5,390,887 A | 2/1995 | Campbell |
| 5,509,182 A | 4/1996 | Nakanishi |
| 5,511,283 A | 4/1996 | Hirose |
| 5,636,408 A | 6/1997 | Dichtel |
| 5,772,380 A | 6/1998 | Cloud et al. |
| D396,440 S | 7/1998 | Reilly |
| 5,775,859 A | 7/1998 | Anscher |
| 5,815,995 A | 10/1998 | Adam |
| 5,897,278 A * | 4/1999 | Frattarola .................. 411/549 |
| 6,027,782 A | 2/2000 | Sherman |

* cited by examiner

HAND MOUNTABLE VEHICLE CARPET AFFIXATION DEVICE

CROSS REFERENCE TO RELATED APPLICATIONS

This application is a continuation-in-part of application Ser. No. 09/738,748, filed Dec. 15, 2000 now U.S. Pat. No. 6,385,812 (Attorney's Docket No. P5995-301700-000006) and Ser. No. 09/750,807, filed Dec. 28, 2000 now U.S. Pat. No. 6,412,142 (Attorney's Docket No. P5995CIP -301700-000028). The disclosure of those applications are fully incorporated by reference herein.

TECHNICAL FIELD OF THE INVENTION

The present invention relates in general to fasteners, and more particularly to systems, devices and methods for releasably securing removable floor mats to the carpeted floors of vehicles.

BACKGROUND OF THE INVENTION

It has long been a practice to equip automobiles, sport utility vehicles, vans and even trucks with carpeting in the interior. While this creates an aesthetically pleasing interior and also aids soundproofing, it creates a problem in that occupants entering the vehicle from the outside will place their feet on the carpet, subjecting the carpet to soiling and accelerated wear.

To prevent the permanently installed carpeting from getting soiled and prematurely worn, vehicle manufacturers and manufacturers of after-market automotive products have developed floor mats that typically provide impervious barriers to moisture and dirt. These floor mats can be quickly removed, cleaned, replaced, and therefore the interior of the vehicle is preserved in a like-new condition.

The easy removability of conventional floor mats militates against their staying in one place on the carpet surface. To prevent the slipping and sliding of conventional vehicle floor mats on carpeted floors, various affixation devices have been developed. Representative of these is the affixation device shown in U.S. Pat. No. 4,403,895 issued to Caldwell et al. The Caldwell et al. device uses a central screw which is screwed into the carpeting pile, and a head which is meant to be received in a respective hole in a rubber floor mat. This conventional device and ones like it have a drawback of seriously and permanently damaging the carpet to which the affixation device has been joined. There is a tendency for this device to pull out of the carpeting when, for example, the floor mat to which it is affixed is suddenly jerked out of the vehicle, as might happen when a cleaning attendant wishes to quickly remove the floor mat. When this happens one is left with a gaping hole in the carpeting. A need therefore persists in the industry for a vehicle floor mat affixation device which (1) may be easily installed and removed by the consumer, (2) is not prone to causing damage to the carpeting if it is forcibly removed, and nonetheless (3) provides substantial resistance to slippage of the mat with respect to the floor.

SUMMARY OF THE INVENTION

According to one aspect of the invention the affixation device has a substantially flat noncircular body with a first face and a second face opposed to the first face. The body has a central axis, a margin and a radius of about ½ to about 2½ inches that extends from the centeral axis to the margin of the body. The radius defines a moment arm that allows rotation of the device about the axis by a human hand and the margin affords purchase points for fingers of the hand. The shape of the body facilitates manual affixation of the device to the floor of the vehicle without tools.

The affixation device also includes an axially extending connector connected to the first face of the body and a fastener attached to the second face. The axially extending connector is inserted to a preformed hole in the carpeting and vehicle floor and then turned by hand, thereby securing the affixation device to the vehicle floor.

In a second aspect of the invention, the device is part of a system for releasably attaching an object to a floor of a vehicle. A second fastener is affixed to the object which is adapted to be releasably securable to the fastener positioned on the second face of the device.

In an affixation method according to the invention, the device is manually positioned such that the first face of the substantially flat noncircular body is adjacent to an upper surface of the floor of the vehicle. The free end of the axially extending connector faces the upper surface of the floor of the vehicle. The affixation device is pressed toward the upper surface of the floor of the vehicle and manually rotated to secure the device to the floor of the vehicle.

BRIEF DESCRIPTION OF THE DRAWINGS

Further aspects of the invention and their advantages may be discerned from the following description when taken in conjunction with the drawings, in which like characters number like parts and in which.

DETAILED DESCRIPTION OF ILLUSTRATED EMBODIMENT

Figure 1:
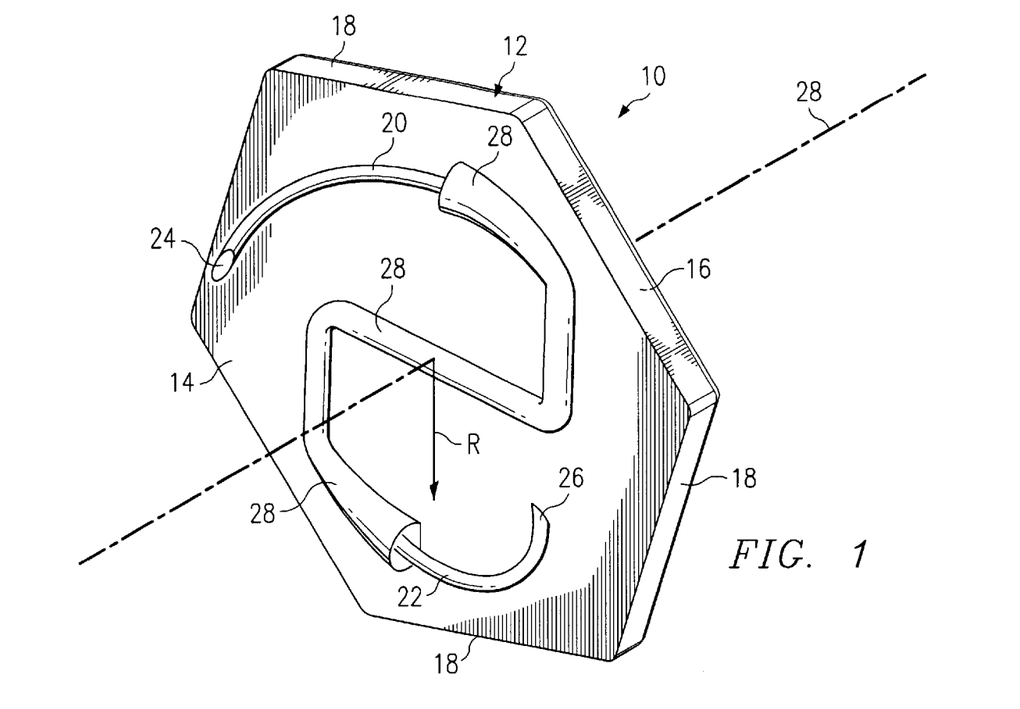
FIG. 1 is an isometric view of a vehicle affixation device according to the invention, particularly illustrating a first surface thereof.

In FIG. 1, a vehicle affixation device is indicated generally as 10 and has a body 12 that is relatively flat in aspect. The body 12 has a first surface 14 and a second or reverse surface 16 (see FIG. 2). In the illustrated embodiment, the body 12 has a margin with a series of sides 18 that are disposed between and join the surfaces 14 and 16. The sides 18 together form a hexagon and, as such, may receive a wrenching device. The device 10 may be in other than hexagonal form, but providing the device in a square, hexagonal or octagonal form forms opposed wrenching surfaces and therefore permits the application of a wrenching tool in order to install the device into a textile layer. Similarly, the provision of opposed wrenching surfaces 18 at the sides of the body 12 provides purchase for a wrenching tool for the nondestructive removal of the affixation device. The sides 18 are nonetheless far enough apart, and sufficiently distant from an axis 28 of the device, that a large moment arm R results, permitting the installation and removal of device 10 by hand, without tools.

The body 12 of the affixation device is preferably formed of a thermoplastic material such as polystyrene, ABS, nylon or other plastic which is relatively tough, durable and inert from attack by dirt, water and grease. Protruding out of the relatively flat surface 14 are at least two hook members or tines 20 and 22. These hook members should be made of a material which is not easily permanently deformed but which exhibits a certain amount of elasticity. Likewise, hook members 20 and 22 should be formed of a material which is resistant to attack by substances likely to be deposited on the carpet, such as water, mud, grease, road tar and salt. Forming hook members 20 and 22 out of metal meets these requirements, particularly if the selected metal is steel, and most preferably if it is a high tensile strength stainless spring steel. For example, hook members 20 and 22 may be formed of pieces (or, as will be explained below, of a single piece) of stainless steel wire having a diameter of 0.025 to 0.060 inches, and more preferably, 0.047 inches. Respective free ends 24 and 26 of the hook members 20 and 22 are preferably sharpened in order to aid their piercing of the carpeting pile. Even more preferably, the ends 24 and 26 are sharpened only on the opposite side facing the surface 14, as this has been found to better entrain the hook members 20 and 22 onto a helical path as they are inserted into the carpeting pile. Alternatively, ends 24 and 26 may be sharpened to a needle point.

Importantly, the hook members 20 and 22 are formed to be substantially disposed on helical paths that are at a substantial distance from an axis 28 of the body 12. Axis 28 is at an angle to surface 14 and matches the pitch (or centerline) of 20. With vehicle carpeting, it has been found that the hook members should proceed about respective helical paths for approximately one third of a turn (120°) around the axis 28, and that the pitch of the hook member through this angle should be approximately one inch. The amount or distance of the helical path and the pitch may be varied according to the material that is used to form the hook members 20, 22 and the nature of the textile layer which the hook members 20 and 22 are designed to attach. For carpeting, a pitch that is as much as 1¼ inch or larger might work. The pitch must be chosen so that the textile layer to which the body 12 is to be affixed will be completely or at least substantially penetrated, but that the hook members 20 and 22 will not progress much beyond the textile layer. For thinner textile layers, the pitch would be less, while for thicker textile layers, the pitch could be made greater.

The use of high tensile strength spring steel to form the hook members 20 and 22 permits each of the hook members to have a very small entrance profile as the free ends 24 and 26 thereof pierce the textile. This forms extremely small holes which, in the case of conventional carpeting, would not exist at all given the relatively loose weave of typical carpet backing. Hence, the affixation of the body 12 to piled carpeting will cause almost no perceptible damage to the carpeting itself.

To maximize resistance against pullout, the tines or hook members 20 and 22 are substantially disposed on helical paths at a substantial radius R from the axis 28 of the body 12. In the illustrated embodiment, radius R is about 0.75 inches. Radius R should be chosen as to not be so large that the entire body 12 becomes unduly large, but yet not so small as to no longer be sufficiently resistant to pullout forces. As radius R increases, the exposed length of the hook members 20 and 22 becomes larger, and therefore their ability to grip the carpeting pile and underlying fabric layer is increased.

The molded plastic body 12 preferably further includes reinforcing portions 28. These reinforcing portions 28, which protrude from surface 14 in the illustrated embodiment and which are molded to cover an inwardly disposed crosspiece 56 (see FIG. 3) which in turn (in this embodiment) connects the hook members 20 and 22 together. These reinforcing portions are designed to lend further resistance against the pullout of the hook members 20, 22 from the body 12.

Figure 2:
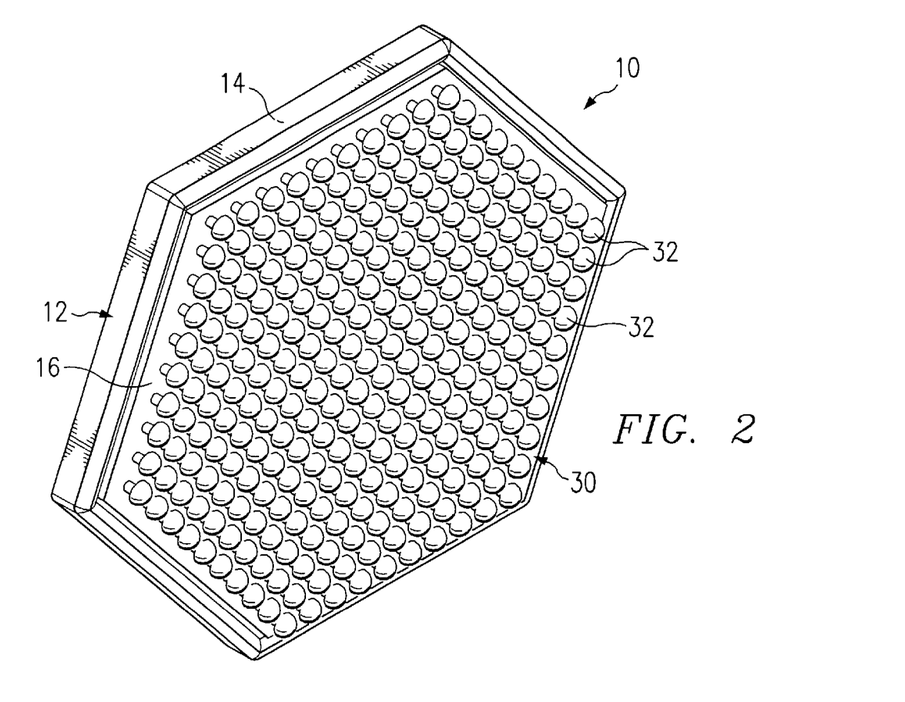
FIG. 2 is an isometric view of the vehicle affixation device shown in FIG. 1, illustrating a reverse or second surface thereof.

In FIG. 2, the second or reverse face 16 of the affixation device 10 is shown. Joined to or molded as a portion of the reverse face 16 is a fastener 30, which preferably is a piece of relatively flat, releasable fastening material, and even more preferably is a piece of DUAL-LOCK® releasable fastening material. The DUAL-LOCK® releasable fastening material takes the form of a two dimensional array of stalks formed to extend from a flat base and having enlarged ends. DUAL-LOCK® material is particularly preferred because of its property of permitting casual contact of one such piece of material with another such piece of material without binding to same. This permits a mating piece of DUAL-LOCK® material to be precisely placed over this piece 30 of the material, and only then pressed home to fasten the two pieces of material together. Other, less preferred forms of fasteners are VELCRO® or other hook and loop material or even metallic or rubber snaps. The DUAL-LOCK® material comes in various densities in the range of 180 to 400 stems per square inch. It has been found that for the application of affixing mats to carpeted vehicle floors, providing this material at a density of 250 stems per square inch works particularly well.

Figure 3:
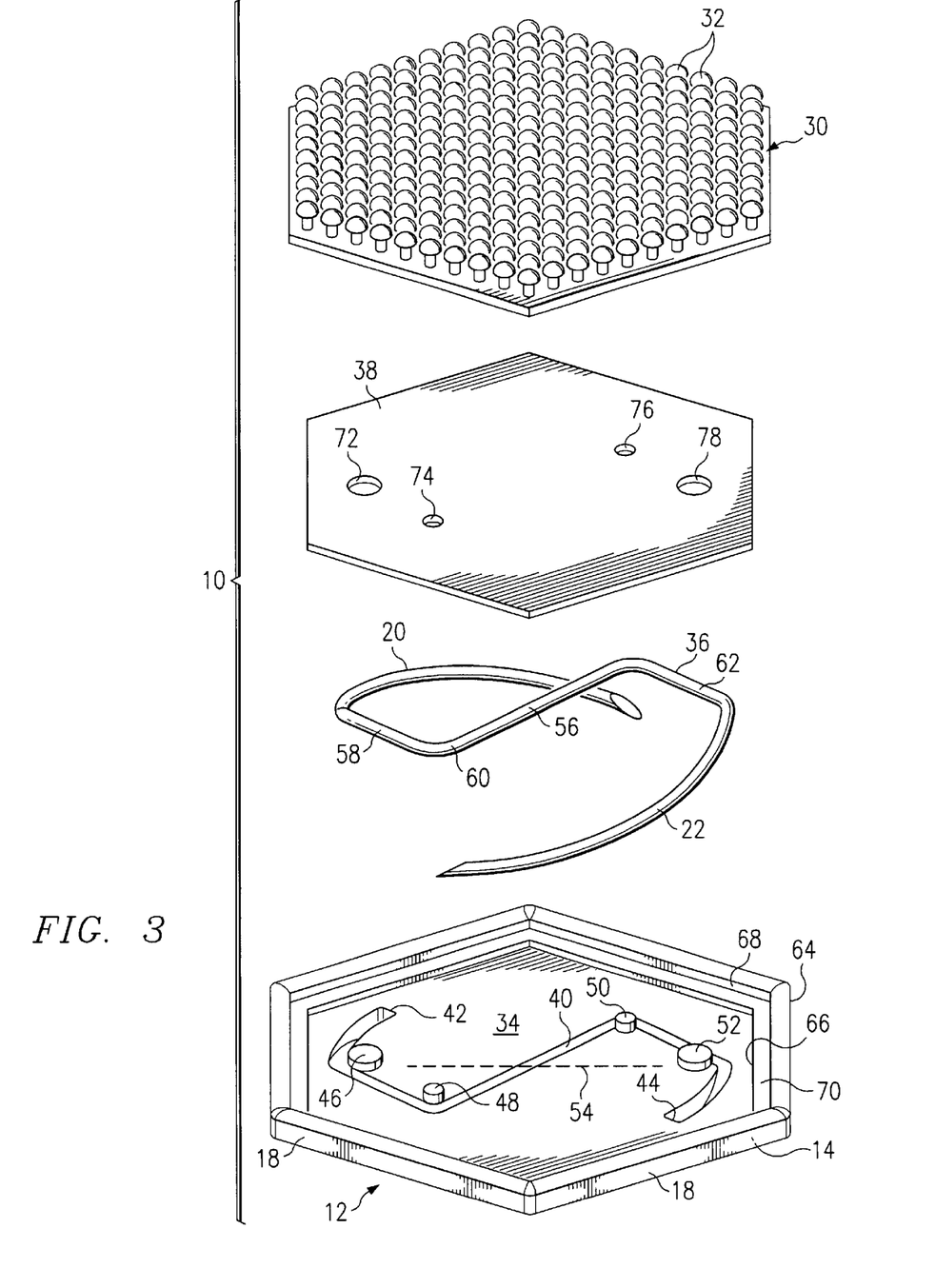
FIG. 3 is an exploded view of the vehicle affixation device, illustrating the subcomponents of the device and a method of assembly according to one embodiment of the invention.

FIG. 3 illustrates one method of assembling together the affixation device 10. In this assembly method, a first plastic piece 34 is provided which receives an integral stainless steel wire element 36, a second molded plastic piece 38, and a layer 30 of DUAL-LOCK® material. Piece 34 has formed therein a channel or track 40 into which the wire element 36 is placed. Holes 42 and 44 at the respective ends of the channel 40 permit hook members 20 and 22 to protrude through to the surface 14 (FIG. 1). Toward the holes or ends 42 and 44, the channel 40 takes respective sloping, helical paths, so as to conform to the helical configuration of the hook members 20 and 22.

The channel 40 is disposed about four protruding elements 46, 48, 50 and 52. These protruding elements permit the easy registration and assembly of the wire element 36 to the piece 34, and provide reinforcement of the corners of the wire piece 36.

The channel 40, and the wire element 36 that goes into it, are so configured as to have a nonlinear path within the plane occupied by piece 34. A lateral axis 54 in this plane is shown in dotted line. If the channel conformed to the axis 54, an undesirable rocking motion by the wire member 36 would be possible when the hook members 20 and 22 are engaged to carpeting pile or the like and the body 12 is then subjected to a force which has a component in parallel to axis 28 but which varies in magnitude between one side 18 and an opposed side 18. The linear crosspiece would rotate about axis 54 permitting the hook members to raise or lower with respect to surface 14 and possibly not allow either hook 20 or 22 to pierce the carpet. The nonlinear path taken by the channel 40 and the wire element 36 prevents this rocking motion and thereby enhances the ability of the hook members 20 and 22 to be retained within the fabric layer to which they are designed to be attached. Crosspiece 56 may join and be made integral with the hook members 20 and 22 and should have a nonlinear path which occupies substantially a single plane as described above. While various nonlinear paths may be used, in the preferred embodiment the nonlinear path taken by the crosspiece 56 includes a first segment 56 that departs from tine 20 at an approximately right angle, a second segment 60 which is formed at a right angle to the segment 58 and which proceeds across the axis of the body 12, and a third segment 62 formed at a right angle to the segment 56 and parallel to the segment 58, the segment 62 joining to tine 22 and segments 58, 60 and 62 residing in substantially the same plane.

After the integral spring wire piece 36 is placed within the channel 40 such that hook members 20 and 22 protrude out of face 14, the second plastic piece 38 is fitted on top of piece 34. Piece 34 has a circumferential lip member or sill 64 with a first, inner sidewall 66 and a second sidewall 68. A land 70 is formed between the vertical surfaces 66 and 68. This land 70 receives the periphery of the plastic piece 38. Plastic piece 38 has holes 72, 74, 76 and 78 that are fitted onto and receive, respectively, upstanding projections 46, 48, 50 and 52. Once the plastic piece 38 is fitted to the first plastic piece 34, the pieces are ultrasonically welded together, thereby containing the wire piece 36 inside of a plastic body. Alternatively, the wire piece 36 can simply be insert-molded with an integral plastic piece that would make up the body 12.

After the plastic piece 38 has been assembled to the piece 34, a circumferential vertical sidewall or lip 68 persists. A peal-off backing is removed from the DUAL-LOCK® releasable fastening material 30 and the piece 30, which has been cut or stamped so as to be the same shape as but slightly smaller than the circumferential lip 68, is applied to the upper surface of the plastic piece 38. This completes the assembly of the affixation device 10.

Figures 4, 5, 6:
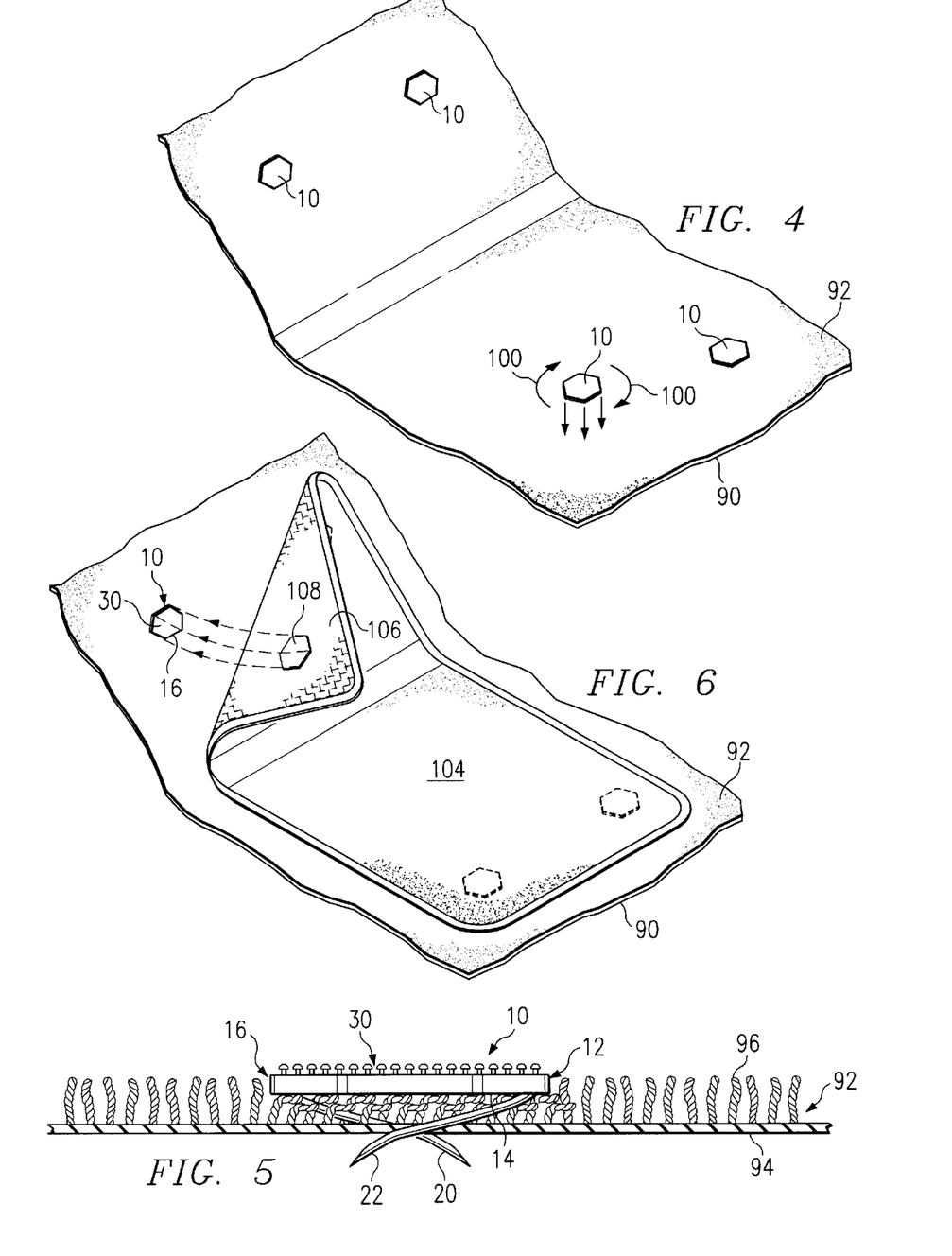
FIG. 4 is an isometric view of a portion of a carpeted vehicle floor, showing representative placement of several vehicle affixation devices.
FIG. 5 is schematic sectional view of a vehicle affixation device as installed into carpeting.
FIG. 6 is schematic illustration of a section of vehicle floor and an installed mat, showing how two surfaces of fastening material are mated together.

FIG. 4 is a schematic illustration of a portion 90 of a vehicle interior, particularly a driver or passenger side of an automobile floor. Typically, the floor 90 has affixed thereto a heavy duty carpeting, indicated by 92, that is relatively wear-resistant and impervious to various kinds of chemical attack. As best seen in FIG. 5, the carpeting 92 includes a backing or base textile layer 94 and a pile 96 formed of a mass of upstanding fibers. The floor portion 90 may have a relatively flat portion and a relatively sloped portion, as is shown.

In the use of the invention, where it is desired to releasably but firmly affix either a rubber or a carpeted mat to the floor portion 90, at least one and possibly several affixation devices 10 are affixed to the carpeting 92. This is done by simply screwing the affixation device 10 into the carpeting device 92; as the device 10 is pushed toward the carpeting 92, the piece is rotated as is shown by the arrows 100, and this may be done by hand. At the end of this process, the affixation device 10 has its hook members 20 and 22 inserted into the carpeting 92, and in particular these hook members 20 and 22 have pierced the base layer 94 at two diametrically opposed locations. The upstanding pile layer 96 may be somewhat depressed underneath the body 12, and this is even desirable because device 10 will then not be apparent after the mat is place. Once device 10 is affixed to carpeting 92, the fastening material 30 is face up and is ready to receive the mat. If it ever becomes desirable to remove the affixation devices 10, this can simply be done by unscrewing them from the carpeting 92. The damage to the carpeting 92 will be virtually imperceptible because of the relatively small diameter of the hook members 20 and 22. But because, through the action of hook members 20 and 22, a relatively large amount of the carpeting 92 has been engaged, it will be very difficult to pull out any affixation device 10 without also rotating the device 10 in the opposite direction of affixing the device. The inadvertent removal of the devices 10, as by jerking out a mat to which the devices 10 are releasably attached, would be very difficult to do.

FIG. 6 is a schematic illustration of this same floor portion 90 after a vehicle mat 104 has been positioned on the carpeting 92. The vehicle mat 104 has affixed to its bottom surface 106 one, if not a plurality, of patches 108 that are formed of a releasable fastening material adapted to matably engage with the fastening material 30 of the affixation devices 10. Preferably, these patches 108 are made of DUAL-LOCK® material at the same density as that of material 30. In the illustrated embodiment, where the surface 106 is made of rubber or the like, the DUAL-LOCK® material 108 is affixed to the surface 106 using a special fixative such as 3M® 94 Primer which includes a mixture of cyclohexane, xylene, and ethanol. Other methods of joining or adhering a releasable material patch 108 to the underside of the mat 104 can be easily thought of. Because of the nature of the DUAL-LOCK® releasable material, the patch 108 can be carefully positioned with respect to the affixation device 10 so that an exact placement can be had before pressing home the patch 108 into the material 30. To remove the mat 104, one simply pulls the mat 104 up from the carpeting 92, whereupon the patch 108 will separate from the material 30. While the material 108 can be separated from the material 30 with a modest force that is perpendicular to their areas, the mated materials 30 and 108 will resist relatively large shear forces so that inadvertent movement of the feet or the like will not cause a shifting of the mat 104. A superior vehicle mat affixation system results.

Figure 7:
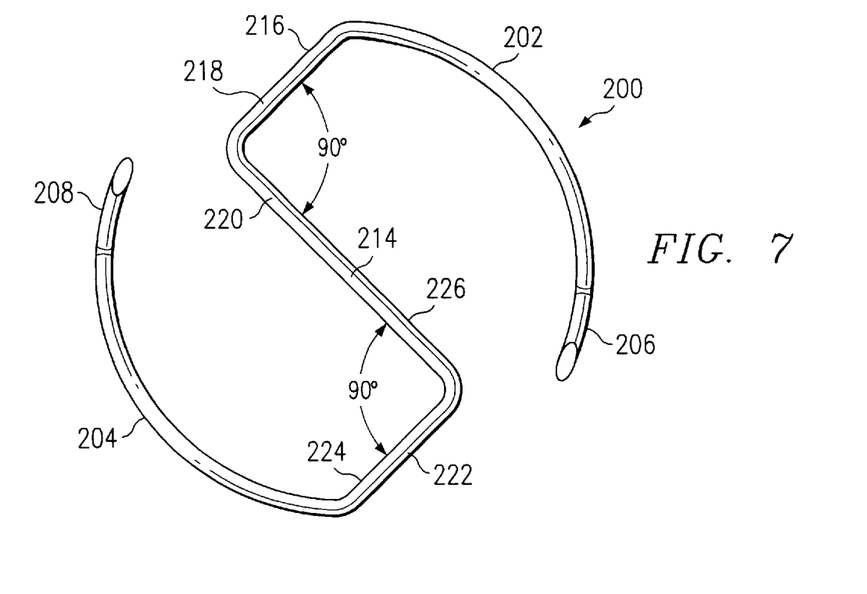
FIG. 7 is a plan view of hook members formed according to an alternative embodiment of the invention.
Figure 8:
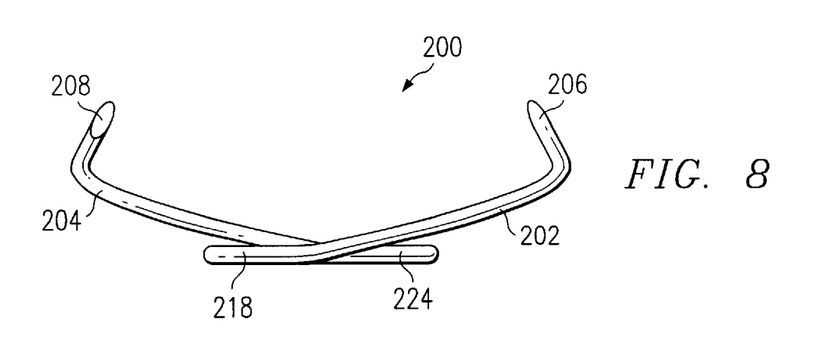
FIG. 8 is a first elevational view of the hook members shown in FIG. 7.
Figure 9:
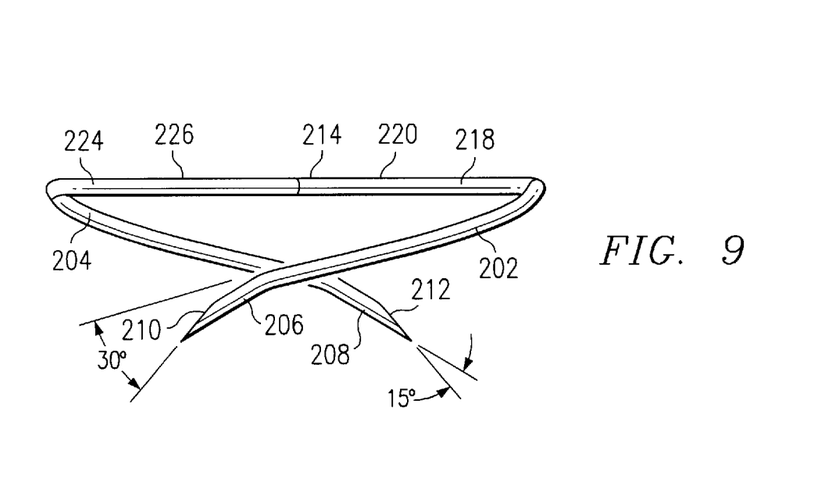
FIG. 9 is a second elevational view of the hook members shown in FIG. 7.

FIGS. 7–9 illustrate an alternative wire element 200 which may be employed in the invention in the place of wire element 36 shown in FIGS. 1 and 3, for example. As before, the wire element 200 has helical hook members 202 and 204 which substantially conform to helical paths. However, each of the hook members 202, 204 terminate in respective terminal portions 206 or 208 that are bent or deflected in an axial direction away from the body surface 14. This bending or deflection is best seen in FIG. 9. In one preferred embodiment, particularly suited for vehicle carpeting, the terminal portions 206, 208 are approximately 0.3 inches long and have been bent out of the otherwise helical path of the hook members 202 and 204 by approximately 30 degrees. The terminal portions 206 and 208 are further formed to be straight rather than curved in this embodiment. As before, terminal portions 206 and 208 are sharpened on faces 210 and 212, respectively, that face away from the carpeting.

While one embodiment of the hook members is shown to be unitary, with the hook members being connected together by a crosspiece and integrally made, this need not be the case. In another embodiment, a wire workpiece is sawed or cut approximately at a crosspiece midpoint 214 to create two separate hook members 202 and 204. These hook member workpieces are then sharpened individually. After sharpening the hook members 202 and 204 are assembled into a thermoplastic body as before. Hook member 202 will have a base portion 216 which has linearly connected, substantially coplanar portions 218 and 220. Similarly, hook member 204 has a base portion 222 which has linearly connected right angle portions 224 and 226 which are substantially coplanar with each other and with base portion members 218 and 220.

The downwardly deflected terminal portions of the hook members 202 and 204 provide a technical advantage for the following reason. As the user presses down on the body 12 each downwardly bent terminal hook member portion 206, 208 will be deflected by the textile layer, and as deflected the terminal hook portions 206, 208 will roughly conform to the original helical path that the rest of the hook members 202–204, in a noncompressed condition, occupy. The angle of attack set up by the helix pitch is therefore essentially preserved even while the user is exerting downward force on the body 12, which force is being resisted by the carpet pile. This force dramatically decreases when the penetration of the carpet pile is achieved, and therefore the rest of the hook member will not be axially compressed. Without the downwardly depressed portions 206 and 208, upon compression the tips of the hook members 202, 204 tend to flatten out so that the helix may be too flat, causing the angle of attack to be less than might be optimum. The bent portions 206, 208 are sufficiently short that there is not a great deal of bending moment exerted at their junction with the rest of the hook members 202, 204, and therefore there is not a lot of flexure at these points.

Figure 10:
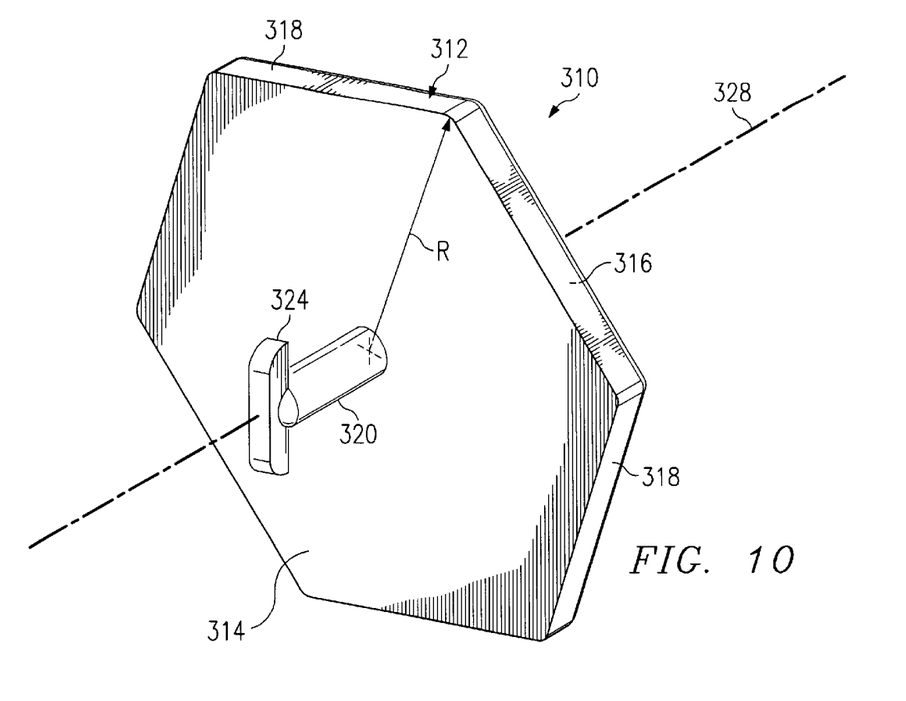
FIG. 10 is an isometric view of an alternative embodiment of the vehicle affixation device of the present invention, particularly illustrating a first surface thereof.

FIGS. 10–16 illustrate an alternative embodiment of the vehicle affixation device. In FIG. 10, a hand-mountable, preferably one-piece vehicle affixation device is indicted generally as 310. The vehicle affixation device 310 has a body 312 that is relatively flat in aspect. The body 312 has a first surface 314 and a second or reverse surface 316 (see FIG. 11). In the embodiment shown in FIGS. 10–11, the body 312 has a margin with a series of sides 318 that are disposed between and join the surfaces 314 and 316. The body 312 of the device 310 has a non-circular (in this case, polygonal) shape that may be formed from a number of sides, preferably six sides as illustrated in FIG. 10.

Figures 12, 13, 14:
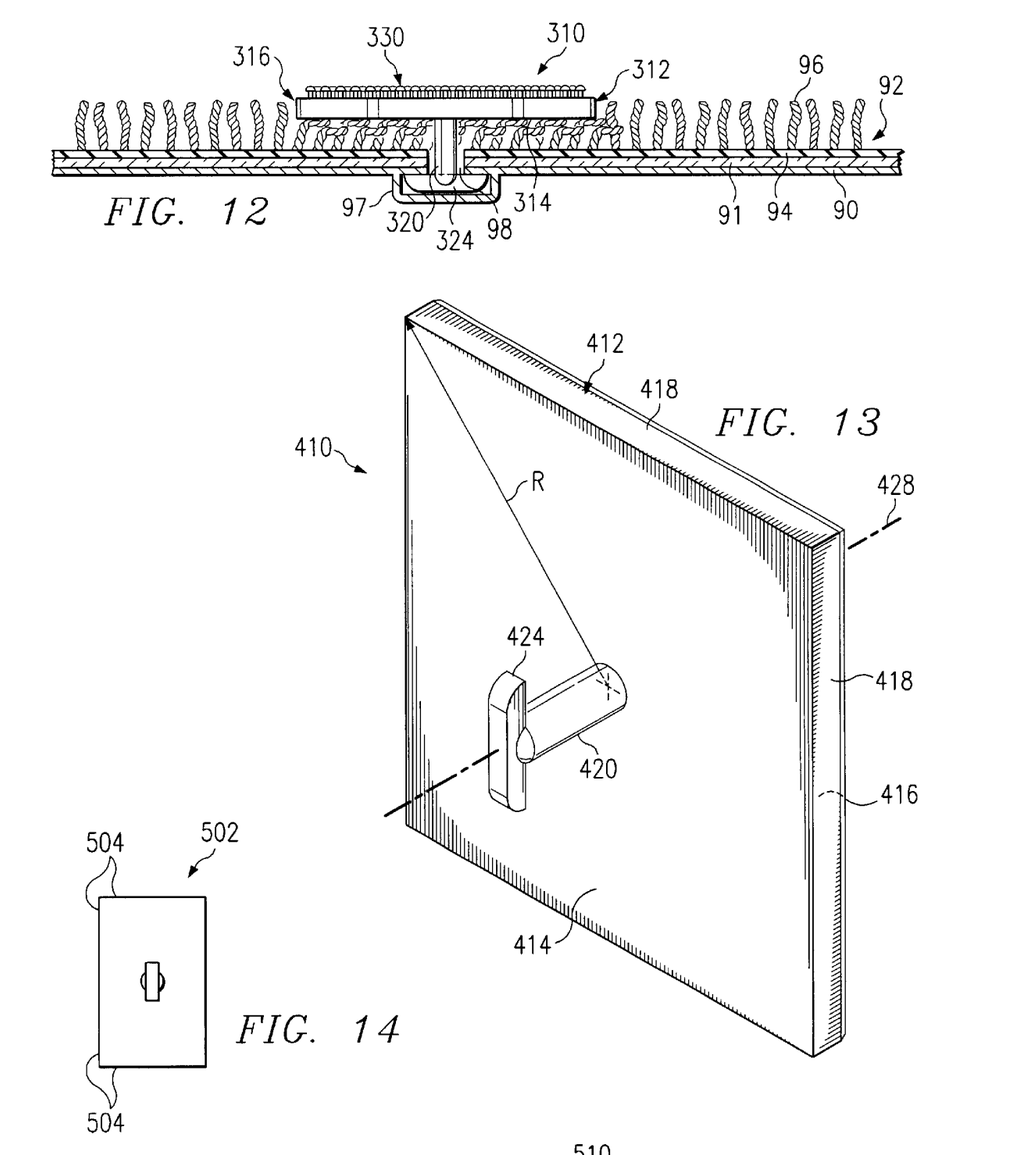
FIG. 12 is a schematic sectional view of the alternative vehicle affixation device shown in FIG. 10, as installed into the floor of a vehicle.
FIG. 13 is an isometric view of an alternative polygon shape of the vehicle affixation device shown in FIG. 10.
FIG. 14 is a top plan view of the first surface of a second alternative polygon shape of the vehicle affixation device shown in FIG. 10.

The polygonal body 312 is formed around a center axis 328. A radius R, from the center axis 328 to the vertices of the polygonal shape, is preferably in the range of approximately ½ to 2½ inches. In the illustrated hexagonal embodiment, R is about 0.93 inches. The polygonal body 312 is sized to be big enough to allow a user to insert and rotate the affixation device 310 by hand without assistance from manual or power tools. But the size of the body 312 is also chosen such that it may be easily maneuvered by hands of average or below-average size and strength. The radius R defines a moment arm which allows the user to apply a minimum force to the sides 318 of the polygonal body 312 to rotate the body about the center axis 328 into the vehicle floor 90 as shown in FIG. 12, but which is not so big that the user could not grasp the margins of body 312 by one hand.

As shown in FIG. 10, a bayonet connector extends from the center of the first surface 314. The bayonet connector includes a shaft 320 and a projection portion 324. The projection portion 324 includes a flat main section with curved edges. The affixation device may instead include various other connectors, such as a hook, that axially extend from the first face of the device and secure the device to the vehicle floor.

The body 312 and the bayonet connector of the alternative embodiment affixation device are preferably integrally formed of a thermoplastic material such as polystyrene, ABS, nylon or other plastic which is relatively tough, durable and inert from attack by dirt, water and grease.

Figure 11:
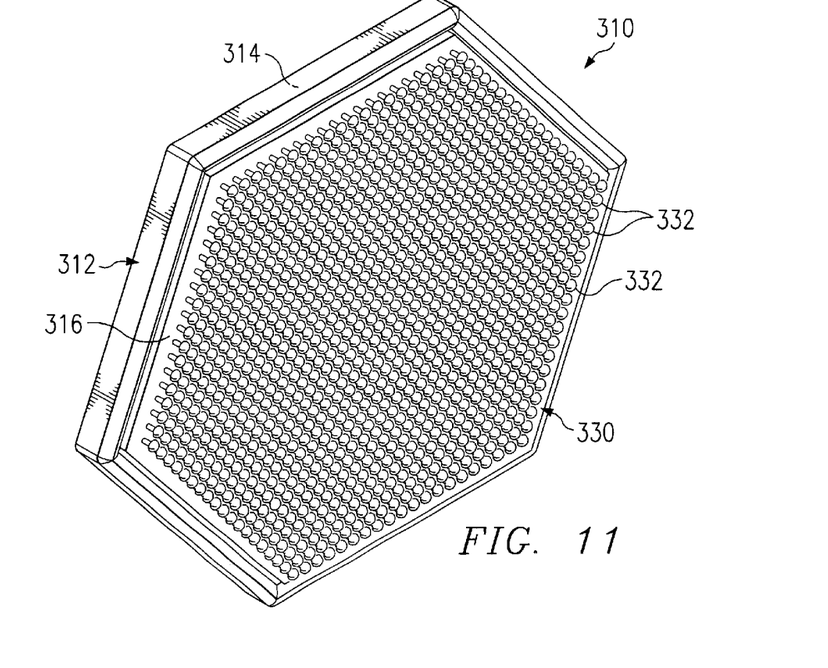
FIG. 11 is an isometric view of the vehicle affixation device shown in FIG. 10, illustrating a second or reverse surface thereof.

In FIG. 11, the second or reverse face 316 of the affixation device 310 is shown. The second face 316 of the affixation device 310 is similar to the second face 16 of the affixation device 10 illustrated in FIG. 2. The second face 316 includes a fastener 330 joined or molded as a portion of the second face 316. The fastener 330 is preferably a piece of relatively flat, releasable fastening material, and even more preferably is a piece of DUAL-LOCK® releasable fastening material. The DUAL-LOCK® releasable fastening material takes the form of a two dimensional array of stalks formed to extend from a flat base and having enlarged ends. DUAL-LOCK® material is particularly preferred because of its property of permitting casual contact of one such piece of material with another such piece of material without binding to the same.

FIG. 12 illustrates the affixation device of the alternative embodiment in use. The vehicle floor 90 has affixed thereto an insulation layer 91. Vehicle carpeting 92 is affixed to the insulation layer 91. The vehicle carpeting 92 includes a backing or base textile layer 94 and a pile 96 formed of a mass of upstanding fibers. The floor 90, insulation layer 91 and the carpeting 92 include at least one aperture 98. The number of apertures may vary depending on the desired number and size of the affixation devices 310. A plate 97, which may be disc-shaped, is affixed as by spot welding underneath the aperture 98 to the bottom surface of the floor 90, thereby forming a cavity. The cavity may also be formed as an indentation or bore in a piece of steel that is part of the vehicle floor.

The projection portion 324 of the bayonet connector is manually inserted and twisted into the aperture 98. The user grips the edges 318 of the polygonal body 312 with her hand to install the affixation device in the vehicle floor 90. As the user presses and rotates the polygonal body 312 about the center axis 328, the upstanding pile layer 96 depresses underneath the body 312 so that the body 312 becomes flush with the carpet 92. The projection portion 324 is positioned in the cavity and secures the affixation device 310 to the vehicle floor 90. Once the device 310 is thus affixed to the vehicle, the fastening material 330 is face up and ready to receive the mat.

FIG. 13 illustrates an alternative polygonally shaped affixation device 410 of the present invention. As illustrated in FIG. 10, the body 412 of the device 410 is flat in aspect with a first surface 414 and a second surface 416. The device 410 has four sides 418 that are disposed between and join surfaces 414 and 416 forming a square. In this embodiment, a bayonet connector with a shaft 420 and a projection portion 424 extends from the center of the first surface 414. The shaft and the projection portion of device 410 are manually inserted and twisted in the vehicle floor in the same manner as described with respect to FIG. 12.

Figure 15:
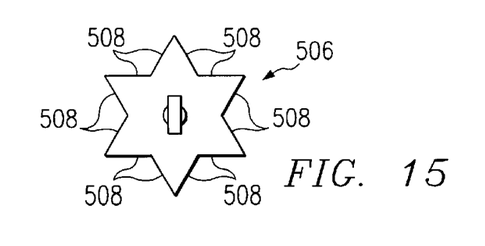
FIG. 15 is a top plan view of the first surface of a third alternative polygon shape of the vehicle affixation device shown in FIG. 10.
Figure 16:
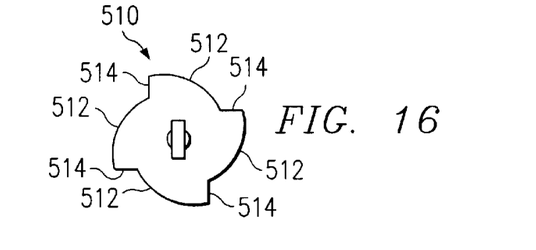
FIG. 16 is a top plan view of the first surface of a further alternative noncircular shape of the vehicle affixation device shown in FIG. 10.

FIGS. 14, 15 and 16 illustrate additional alternative non-circular shapes of the present invention. Noncircular shapes are preferred because they better afford gripping surfaces, purchase points or lands by which the fingers of the human hand can impart torque to the device. A circular shape is not preferred because it permits the human hand to slip around it.

FIG. 14 illustrates a rectangular shape 502 with edges 504. By applying fingers to opposite long edges 504, the user is easily able to twist it. FIG. 15 illustrates a star shape 506 with torque-receiving edges 508. FIG. 16 illustrates a ratchet shape 510 with curved edges 512 and straight edges 514, the straight edges 514 being adapted to receive torque from the fingers. Each vehicle affixation device is formed so that a user is capable of gripping the edges of the device and twisting the device to insert it into the vehicle floor. The edges of each device act as wrench engaging surfaces in order to allow the user to manipulate the device. The user is able to insert and twist the device into an aperture in a vehicle floor with a minimum amount of force.

While the present invention has been illustrated with respect to a vehicle mat affixation system, the present invention has application to any situation in which an object is desired to be releasably affixed to a textile layer. For example, an affixation device, with suitable modifications concerning pitch and length of the helical hook members, can be used to affix objects to fabric walls of the type which exist in office cubicles or residences. The affixation devices 10, 310 or a variant can be used in any situation in which a relatively piercable layer is presented as a mounting surface, but where the layer is tear-resistant and is of limited thickness. The firmness by which the object is to be affixed to the fabric or textile layer may be varied by varying the number of stems per square inch of the DUAL-LOCK® material, or by substituting another set of releasable materials. Further, while one illustrated embodiment of the affixation device has two, diametrically opposed helical hook members that define segments through approximately one third of an axial revolution, and which are screwed into the carpet with a clockwise motion, other embodiments of this device could have more hook members and their pitch, length, or helical direction could be varied from that shown, depending on the conceived application.

Therefore, while the invention has been described with respect to the illustrated embodiment, it is not limited thereto, but only by the scope and spirit of the appended claims.

We claim:

1. A device for fastening an object to a floor of a vehicle, comprising:
    a substantially flat plate-shaped noncircular body having a generally defined total horizontal length and a generally defined total horizontal width of said body that are both substantially longer than the vertical thickness of said body, said body including:
        a first face,
        a second face opposed to the first face,
        a center axis,
        a margin having at least one pair of wrench engaging surfaces, and
        a length of about ½ to about 2½ inches that extends from the center axis to the margin of the body, said length defining a moment arm that allows rotation of the device about the center axis by a human hand and the wrench engaging surfaces afford purchase points for fingers of the hand;
    a connector affixed to the first face for connecting the device to the floor of the vehicle; and
    a fastener affixed to the second face for fastening to the object.

2. The device of claim 1, wherein the body is formed of plastic.

3. The device of claim 1, wherein the fastener comprises a layer of releasable fastening material adapted for fastening to another layer of releasable fastening material.

4. The device of claim 3, wherein at least one of the layers of releasable fastening material comprises a plurality of upstanding stalks with enlarged heads.

5. The device of claim 1, wherein the connector is a bayonet connector.

6. The device of claim 1, wherein the margin of the body is a polygon with sides that provide grip surfaces to manually rotate the device.

7. The device of claim 1, wherein the margin of the body is star shaped.

8. The device of claim 1, wherein the margin of the body is ratchet shaped.

9. A system for releasably attaching an object to a floor of a vehicle comprising:
    at least one affixation device having a substantially flat plate-shaped noncircular body, said body including:
        a first face,
        a second face opposed to the first face,
        a center axis,
        a margin having at least one pair of wrench engaging surfaces, and
        a length of about ½ to about 2½ inches that extends from the center axis to the margin of the body, said length defining a moment arm that allows rotation of the device about the center axis by a human hand and the wrench engaging surfaces afford purchase points for fingers of the hand,
    said affixation device having a connector affixed to the first face, and a first fastener disposed on the second face; and
    at least one second fastener affixed to the object, the second fastener releasably securable to the first fastener.

10. The system of claim 9, wherein the body is formed of plastic.

11. The system of claim 9, wherein the fastener comprises a layer of releasable fastening material adapted for fastening to another layer of releasable fastening material.

12. The system of claim 11, wherein at least one of the layers of releasable fastening material comprises a plurality of upstanding stalks with enlarged heads.

13. The system of claim 9, wherein the connector is a bayonet connector.

14. The system of claim 9, wherein the margin of the body is a polygon with sides that provide grip surfaces to manually rotate the device.

15. The device of claim 9, wherein the margin of the body is star shaped.

16. The device of claim 9, wherein the margin of the body is ratchet shaped.

17. A method for affixing an object to a floor of a vehicle, comprising the steps of:

manually positioning a first face of a substantially flat plate-shaped noncircular affixation device body adjacent an upper surface of the floor of the vehicle including presenting a free end of an axially extending connector upstanding from the first face toward the upper surface of the floor of the vehicle;

pressing the affixation device toward the upper surface of the floor of the vehicle; while performing said step of pressing, securing the affixation device to the floor of the vehicle by:

engaging at least one pair of wrench engaging surfaces on a margin of the body providing purchase points for fingers on a hand, said margin being disposed at a length of about ½ to about 2½ inches from a center axis of the body, and manually rotating said affixation device with the hand, said length defining a moment arm about said center axis that permits rotation of the device by the hand; and mating a fastener, said fastener being formed on a second face of the body opposed to the first face of the body, to a fastener on the object.

* * * * *